(12) United States Patent
Qiu et al.

(10) Patent No.: US 8,406,194 B2
(45) Date of Patent: *Mar. 26, 2013

(54) COMMUNICATION SYSTEM, NETWORK HANDOVER PROCESSING METHOD AND APPARATUS

(75) Inventors: Yong Qiu, Shenzhen (CN); Min Huang, Shenzhen (CN); Ying Huang, Shenzhen (CN); Hongzhuo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 391 days.

This patent is subject to a terminal disclaimer.

(21) Appl. No.: 12/683,824

(22) Filed: Jan. 7, 2010

(65) Prior Publication Data
US 2010/0113033 A1   May 6, 2010

Related U.S. Application Data

(63) Continuation of application No. PCT/CN2008/072090, filed on Aug. 21, 2008.

(30) Foreign Application Priority Data

Aug. 22, 2007 (CN) .......... 2007 1 0076513

(51) Int. Cl.
*H04W 4/00* (2009.01)
*H04L 12/56* (2006.01)
*H04Q 7/20* (2006.01)

(52) U.S. Cl. ........ 370/331; 370/394; 455/436; 455/438; 380/272

(58) Field of Classification Search .......... 370/216–394; 455/436–561, 67.11, 67.12; 380/272–278
See application file for complete search history.

(56) References Cited

U.S. PATENT DOCUMENTS

| 5,913,167 | A  | 6/1999 | Bonta et al. |
| 6,381,457 | B1 | 4/2002 | Carlsson et al. |
| 7,782,818 | B2 | 8/2010 | Hurtta et al. |
| 7,953,043 | B2 | 5/2011 | Kim et al. |

(Continued)

FOREIGN PATENT DOCUMENTS

| CN | 1859791 A | 11/2006 |
| CN | 1930794 | 3/2007 |

(Continued)

OTHER PUBLICATIONS

European Office Action, European Application No. 08 784 081.5 - 2412, Applicant: Huawei Technologies Co., Ltd., Dated Oct. 12, 2011, 6 pages.

(Continued)

*Primary Examiner* — Afsar M. Qureshi
(74) *Attorney, Agent, or Firm* — Slater & Matsil, L.L.P.

(57) ABSTRACT

A communication system, a network handover processing method and a network handover processing apparatus are disclosed. The method includes the following steps: receiving, by a target evolution NodeB (T-eNB), identity information sent from a user equipment (UE), the identity information being allocated to the UE by a source evolution NodeB (S-eNB); and sending, by the T-eNB, parameters to the UE if identity information, matching the received identity information sent from the UE, is available in the T-eNB, wherein the parameters are allocated to the UE. The apparatus includes a receiving module and a sending module. The communication system, network handover processing method and network handover processing apparatus can reduce the state change times of the UE in the network handover process and save the system resources.

11 Claims, 3 Drawing Sheets

U.S. PATENT DOCUMENTS

| | | | |
|---|---|---|---|
| 2005/0124344 A1 | 6/2005 | Laroia et al. | |
| 2006/0056395 A1 | 3/2006 | Huomo et al. | |
| 2006/0251021 A1 | 11/2006 | Nakano et al. | |
| 2006/0291416 A1 | 12/2006 | Rexhepi et al. | |
| 2007/0230402 A1 | 10/2007 | Kim et al. | |
| 2008/0049674 A1 | 2/2008 | Cha et al. | |
| 2008/0049676 A1* | 2/2008 | Xiang | 370/331 |
| 2008/0051088 A1 | 2/2008 | Tariq et al. | |
| 2008/0139203 A1 | 6/2008 | Ng et al. | |
| 2008/0267127 A1 | 10/2008 | Narasimha et al. | |
| 2009/0036129 A1 | 2/2009 | Harada et al. | |
| 2009/0061878 A1 | 3/2009 | Fischer | |
| 2009/0073933 A1 | 3/2009 | Madour et al. | |
| 2009/0156212 A1 | 6/2009 | Motegi et al. | |
| 2009/0201881 A1* | 8/2009 | Chun et al. | 370/331 |
| 2010/0113033 A1 | 5/2010 | Qiu et al. | |
| 2010/0238799 A1* | 9/2010 | Sebire | 370/225 |
| 2010/0284370 A1 | 11/2010 | Samar et al. | |
| 2012/0021749 A1* | 1/2012 | Qiu et al. | 455/438 |

FOREIGN PATENT DOCUMENTS

| | | |
|---|---|---|
| CN | 1957625 | 5/2007 |
| CN | 1997200 A | 7/2007 |
| CN | 101374321 | 2/2009 |
| EP | 1 345 370 A2 | 9/2003 |
| EP | 1 418 711 A2 | 5/2004 |
| WO | 2006/057878 A2 | 6/2006 |

OTHER PUBLICATIONS

Samsung, "Handover procedure for LTE_ACTIVE UEs," 3GPP TSG-RAN WG2 #50 meeting, R2-060078, Document for: Discussion and Decision, XP 050130235, 6 pages, Jan. 9-13, 2006, Sophia-Antipolis, France.

Ericsson, "Assembly of Intra-E-UTRAN handover command," 3GPP TSG-RAN WG3 #55, R3-070448, Document for: Discussion and Decision, XP 050161335, 5 pages, Feb. 12-16, 2007, St. Louis, Missouri, US.

Ericsson, et al., "Radio Link Failure and Context Recovery," 3GPP TSG-RAN WG2 Meeting #58, R2-071716, *R2-071229*, Document for: Discussion and Decision, 3 pages, May 7-11, 2007, Kobe, Japan.

Nokia Siemens Networks, et al., "Radio Link Failure Recovery," 3GPP TSG-RAN WG2 Meeting #58, R2-072382, Document for: Discussion and Decision, 8 pages, Jun. 25-29, 2007, Orlando, Florida, US.

Written Opinion of the International Searching Authority, International Application No. PCT/CN2008/072090, Applicant: Huawei Technologies Co., Ltd., et al., Date of mailing: Dec. 4, 2008, 8 pages.

Supplementary European Search Report, European Application No. 08784081.5-2412, International Application No. PCT/CN2008/072090, Dated: Aug. 10, 2010, 9 page.

United States Non-Final Office Action received in U.S. Appl. No. 13/249,062, mailed Dec. 16, 2011, 19 pages.

United States Final Office Action received in U.S. Appl. No. 13/249,062, mailed Mar. 22, 2012, 9 pages.

United States Non-Final Office Action received in U.S. Appl. No. 13/249,062, mailed May 16, 2012, 24 pages.

Chinese Office Action received in Chinese application No. CN 200880013614.6; mailed Jun. 4, 2012, and English Translation, 7 pages.

* cited by examiner

COMMUNICATION SYSTEM, NETWORK HANDOVER PROCESSING METHOD AND APPARATUS

CROSS REFERENCE TO RELATED APPLICATIONS

This application is a continuation of International Application NO. PCT/CN2008/072090 filed on 21 Aug. 2008, which claims priority to Chinese Patent Application No. 200710076513.0, filed on Aug. 22, 2007, both of which are hereby incorporated by reference in their entireties.

FIELD OF THE INVENTION

The present invention relates to a wireless communication technology, and in particular, to a communication system, a network handover processing method and a network handover processing apparatus.

BACKGROUND OF THE INVENTION

In an evolved network architecture, the handover of an X2 interface takes place between Evolved NodeBs (eNodeBs). A eNodeB where a User Equipment (UE) is currently located is called a Source eNodeB (S-eNB). A eNodeB to which the UE is handed over is called a Target eNodeB (T-eNB). The handover is a process of handing over the UE from a cell controlled by the S-eNB to a cell controlled by the T-eNB.

The handover process in the prior art is as follows:

The UE context in the S-eNB includes roaming restriction information. The information is provided at the setup of a connection or the update of a last Tracking Area (TA).

According to the measurement result of the UE and the Radio Resource Management (RRM) of the S-eNB, the S-eNB determines to hand over the UE to a cell controlled by the T-eNB.

The S-eNB sends a handover request message to the T-eNB. The message carries mandatory information for the handover preparation on the T-eNB, including: MME UE S1AP ID (identity), old enb UE S1AP ID, target cell ID, Radio Resource Control (RRC) context, and System Architecture Evolution (SAE) bearer context. The T-eNB addresses the S-eNB and the Evolved Packet Core (EPC) according to MME UE S1AP ID or enb UE S1AP ID. The SAE bearer context includes the mandatory address information of the radio network layer and transport network layer, the Quality of Service (QoS) profile of the SAE bearer, and possible configuration information of the access layer. The T-eNB is configured with necessary resources.

The T-eNB implements admission control to improve the handover success possibility according to the received QoS profile of the SAE bearer. If the T-eNB is able to meet the resource requirement of the SAE bearer, the T-eNB allocates appropriate resources according to the received QoS profile of the SAE bearer and meanwhile, reserves a Cell-Radio Network Temporary Identifier (C-RNTI).

The T-eNB sends a handover request ACK message to the S-eNB. The message carries the newly allocated C-RNTI and parameters, for example, access parameters, Radio Network Layer (RNL) and/or Transport Network Layer (TNL) information for setting up a forwarding tunnel.

The UE receives a handover command message sent from the S-eNB. According to the message, the UE implements the handover process. The message carries the newly allocated C-RNTI and possible start time.

If the target cell is accessed successfully, the UE sends a handover confirm message to the T-eNB, indicating that the handover is complete. The T-eNB checks whether the C-RNTI in the message is allocated by itself.

The T-eNB sends a handover complete message to the EPC, indicating that the UE have changed the cell. The EPC hands over the data path to the T-eNB and releases the relevant user plane resources and transport network layer resources of the S-eNB.

The EPC sends a handover complete ACK message to the T-eNB to confirm that the handover is complete.

The T-eNB sends a release resource message to the S-eNB to trigger the S-eNB to release resources.

Upon reception of the release resource message, the S-eNB releases the radio resources and control plane resources related to the UE context.

In the above handover preparation process, if the radio link between the S-eNB and the UE fails, the UE changes the state during the subsequent handover. As a result, the handover is delayed and the system resources are wasted.

SUMMARY OF THE INVENTION

Embodiments of the present invention provide a communication system, a network handover processing method and a network handover processing apparatus.

A network handover processing method provided in an embodiment of the present invention includes:

receiving, by a target evolution NodeB (T-eNB), identity information sent from a user equipment (UE), which comprises the identity information allocated to the UE by a source evolution NodeB (S-eNB); and sending, by the T-eNB, parameters to the UE if identity information, matching the received identity information sent from the UE, is available in the T-eNB, wherein the parameters are allocated to the UE by the T-eNB.

A network handover processing apparatus provided in an embodiment of the present invention includes:

a receiving module, adapted to receive ID information sent from a UE, where the

ID information is allocated for the UE by an S-eNB; and a sending module, adapted to send parameters allocated for the UE to the UE if identity information, matching the received identity information sent from the UE, is available in the T-eNB.

A method includes:

sending, by a user equipment (UE), identity information associated with the UE to a target evolution NodeB (T-eNB), which comprises the identity information allocated to the UE by a sourse evolution NodeB (S-eNB); and receiving, by the UE, parameters allocated by the T-eNB from the T-eNB, wherein the parameters is sent by the T-eNB if a context of the UE does exist in the T-eNB which is determined according to the identity information sent from the UE.

A communication system includes a user equipment (UE), wherein the UE is in communication with a base station and is configured to send identity information associated with the UE to a target evolution NodeB (T-eNB), and receive parameters allocated by the T-eNB for the UE from the T-eNB, wherein the parameters is sent by the T-eNB if a context of the UE does exist in the T-eNB which is determined according to the identity information sent from the UE.

The communication system, network handover processing method and network handover processing apparatus in the embodiments of the present invention determine whether the T-eNB is the selected T-eNB during the network handover preparation, that is, check whether the context information of the UE exists by judging whether the T-eNB has ID information the same as the ID information sent from the UE. If the same ID information exists, the handover process is continued. Thus, the state change times of the UE in the network handover process are reduced, and the system resources are saved.

DETAILED DESCRIPTION OF THE INVENTION

The embodiments of the present invention are hereinafter described in detail with reference to the accompanying drawings.

During the handover preparation in an evolved network, if a radio link failure occurs between the S-eNB and the UE, the UE detects a cell with better signal quality and sends a cell update message to the T-eNB corresponding to the cell. If the cell previously received a handover request message sent from the UE during the handover preparation and the T-eNB stores the context of the UE, the T-eNB may send the parameters such as the air interface resource configuration information, security parameter, and C-RNTI to the UE through a cell update confirm message or other messages so that the handover process can be continued.

During the handover preparation in an evolved network, if a radio link failure occurs between the S-eNB and the UE, the UE detects a cell with better signal quality and sends a cell update message to the T-eNB corresponding to the cell. The ID information allocated by the S-eNB may be carried in the cell update message or other RRC layer access messages sent to the T-eNB. Alternatively, the cell update cause value may be carried in the cell update message or other RRC layer access messages to the T-eNB. The T-eNB checks whether identity information, matching the received identity information sent from the UE, is available in the T-eNB, if identity information is available in the T-eNB, it indicates that the context of the UE does exist in the T-eNB. In this case, the T-eNB delivers the relevant radio parameter information, security parameter, and C-RNTI to the UE. The handover process is continued. The specific process is described below with reference to FIG. 1.

Step 101: The S-eNB sends a handover request message to a candidate T-eNB. One or more candidate T-eNBs may be available. Accordingly, the S-eNB may send a handover request message to one or more candidate T-eNBs. In this embodiment, two candidate T-eNBs are selected, that is, T-eNB1 and T-eNB2.

The handover request message carries the ID information allocated for the UE by the S-eNB. For example, the ID information may include one or any combination of: C-RNTI, S-TMSI, other ID of UE, source cell ID, and S-eNB ID.

Figure 1:
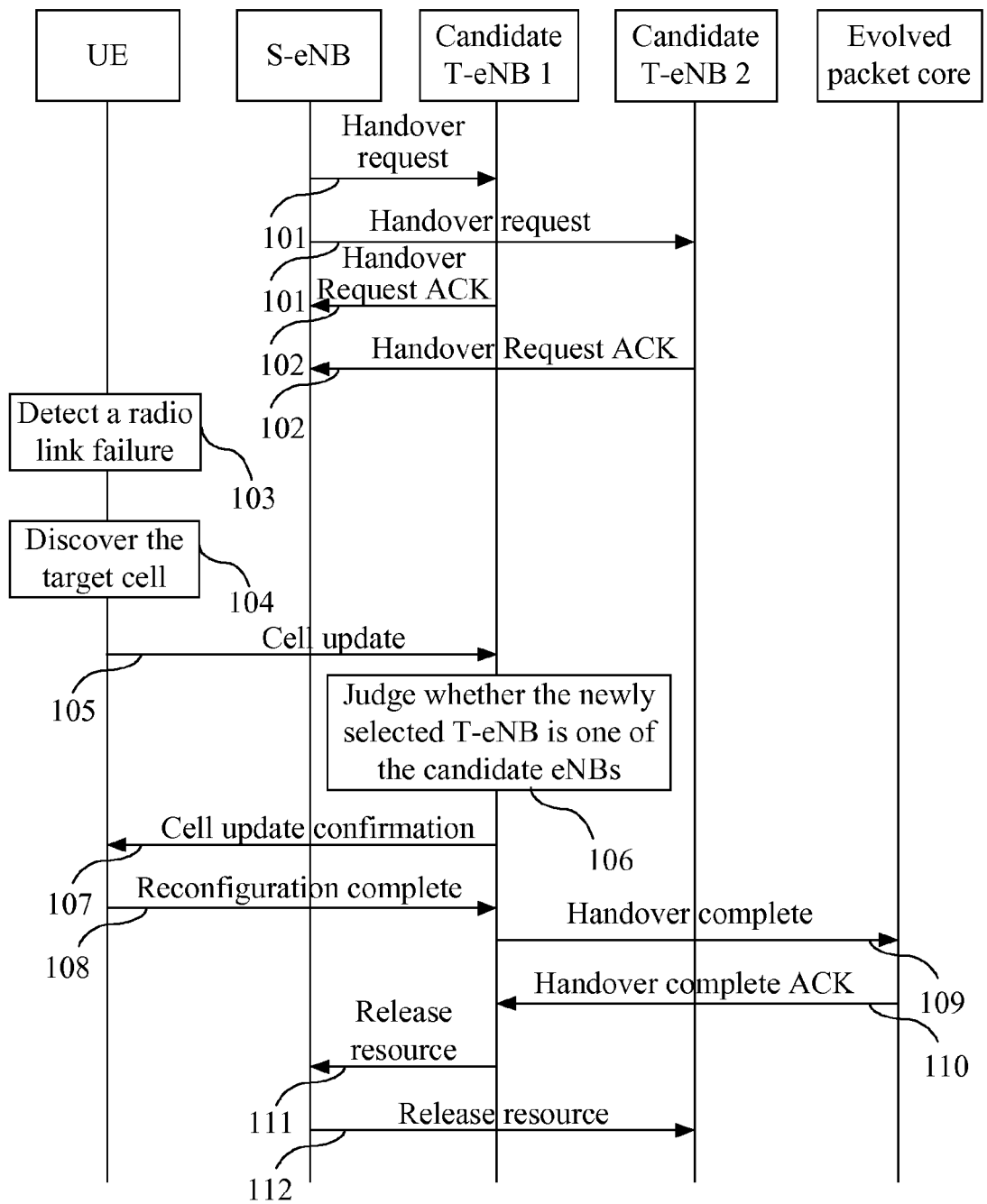
FIG. 1 shows a first flowchart of a network handover processing method according to an embodiment of the present invention.

Step 102: If the candidate T-eNBs accept the handover request and respond with a handover request ACK message, the S-eNB may receive multiple handover request ACK messages from different candidate T-eNBs. As shown in FIG. 1, the candidate T-eNB1 and T-eNB2 respectively send a handover request ACK message to the S-eNB. Through the handover request ACK message, the candidate T-eNBs may allocate a new C-RNTI to the UE. The security parameter and radio configuration parameter container may also be allocated. The radio configuration parameter container may include the Radio Bearer (RB) and Packet Data Convergence Protocol (PDCP) parameters. This embodiment does not limit the parameters that can be allocated by the candidate T-eNBs.

Step 103: The UE detects that the radio link between the UE and the S-eNB fails.

Step 104: The UE finds a target cell with better signal quality and connects to the cell.

Step 105: The UE sends a cell update message to an eNB corresponding to the cell, that is, a new T-eNB.

The cell update message carries the ID information allocated by the S-eNB. For example, the ID information may include one or any combination of: C-RNTI, S-TMSI, other ID of UE, source cell ID, and S-eNB ID.

Further, the cell update message may carry a cell update cause value, for example, "radio link failure".

Step 106: The new T-eNB judges whether itself is the candidate T-eNB selected in step 101.

Upon reception of the cell update message, the new T-eNB obtains the ID information that is allocated for the UE by the S-eNB and carried in the message, and queries whether identity information, matching the received identity information sent from the UE, is available in the T-eNB. If the identity information is available in the T-eNB, it indicates that the context of the UE does exist in the T-eNB; that is, the new T-eNB is the candidate T-eNB selected in step 1, and the process goes to step 107. If the identity information isn't available in the T-eNB, the T-eNB sends a cell update Failure message to the UE and ending the process. In FIG. 1, the T-eNB selected by the UE is the T-eNB1.

Step 107: The new T-eNB constructs a cell update confirm message and sends the message to the UE. The message carries the parameters allocated for the UE by the T-eNB. The message may carry the security parameter, C-RNTI parameter, and parameters in the radio configuration parameter container. This embodiment does not limit the parameters that can be allocated by the candidate T-eNBs. The condition for keeping the security parameter unchanged is: the UE does not delete the $K_{ENB}$ key during the radio link failure; the UE uses the key after receiving the cell update confirm message.

Step 108: The UE returns a mobility complete message to the T-eNB. The message includes the configuration information of some confirmed radio parameters, for example, RB.

Step 109: Upon reception of the mobile complete message, the T-eNB sends a handover complete message to the mobility management Entity (MME).

Step 110: The MME returns a handover complete ACK message to the T-eNB.

Step 111: The T-eNB notifies the S-eNB to release resources and sends a release resource message to the S-eNB.

Step 112: When multiple candidate T-eNBs are available, the S-eNB sends a release resource message to other candidate T-eNBs.

In this embodiment, the handover request message that the S-eNB sends to the candidate T-eNBs carries the ID information allocated for the UE by the S-eNB. The cell update message that the UE sends after the radio link between the UE and the S-eNB fails also carries the ID information allocated for the UE by the S-eNB. The new T-eNB receiving the cell update message judges whether identity information, matching the received identity information sent from the UE, is available in the T-eNB. If the identity information is available in the T-eNB, the new T-eNB is the candidate T-eNB selected by the UE during the handover preparation, and the context of the UE is already stored. Thus, the T-eNB does not need to obtain the context from the S-eNB, and the handover delay is reduced. The UE can stay in the active state, instead of changing from the active state to the idle state and then changing back to the active state. Thus the state change times are reduced and the system resources are saved.

Second Embodiment

When the S-eNB detects that the radio link with the UE fails, the S-eNB sends a message to a candidate T-eNB through the X2 interface. The message carries the ID information allocated for the UE by the S-eNB. The specific process is described below with reference to FIG. 2.

Step 201: The S-eNB sends a handover request message to a candidate T-eNB. One or more candidate T-eNBs may be available. Accordingly, the handover request message may be sent to one or more candidate T-eNBs. In this embodiment, two candidate T-eNBs are selected.

Figure 2:
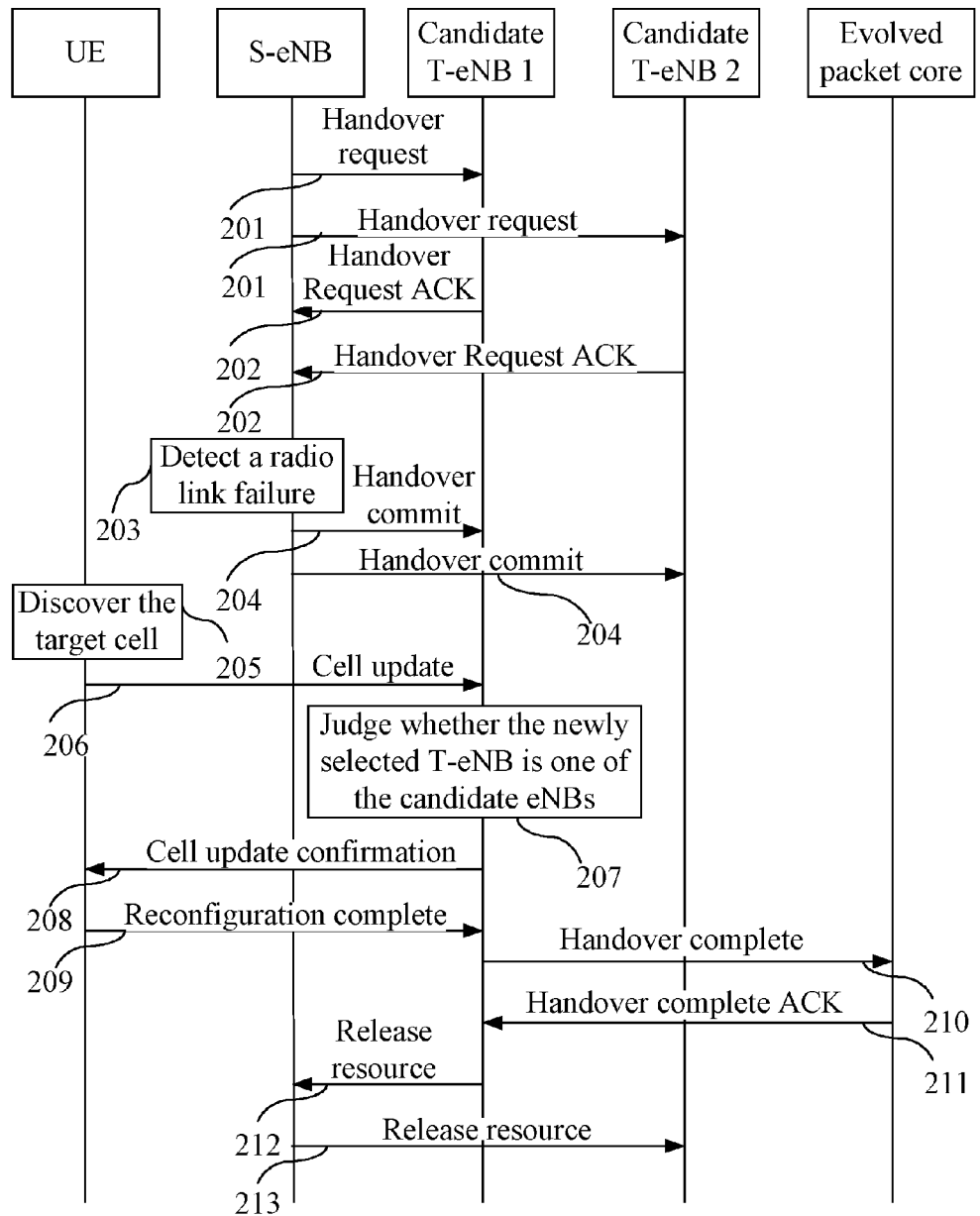
FIG. 2 shows a second flowchart of a network handover processing method according to an embodiment of the present invention.

Step 202: If the candidate T-eNBs accept the handover request, the candidate T-eNBs return a handover request ACK message to the S-eNB. The S-eNB may receive multiple handover request ACK messages from different candidate T-eNBs. As shown in FIG. 2, the candidate T-eNB1 and T-eNB2 respectively return a handover request ACK message to the S-eNB.

Through the handover request ACK message, the candidate T-eNBs may allocate a new C-RNTI to the UE. The security parameter and radio configuration parameter container may also be allocated. The radio parameter container may include the RB and PDCP parameters. This embodiment does not limit the parameters that can be allocated by the candidate T-eNBs.

Step 203: The S-eNB detects that the radio link between the UE and the S-eNB fails.

Step 204: The S-eNB sends a message to one or more candidate T-eNBs through the X2 interface. For example, the message may be a handover commit message and the message carries the ID information allocated for the UE by the S-eNB. For example, the ID information may include one or any combination of: C-RNTI, S-TMSI, other ID of UE, source cell ID, and S-eNB ID.

Steps 205-213 are similar to the corresponding steps in the first embodiment.

The enumerated messages and the carried parameters in this embodiment are exemplary only. The present invention does not limit the specific forms of the messages or specific forms of the parameters carried in the messages.

Figure 3:
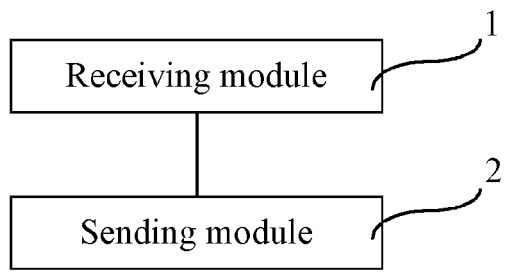
FIG. 3 shows a structure of a network handover processing apparatus according to a first apparatus embodiment of the present invention.

An embodiment of the present invention also provides a network handover processing apparatus. As shown in FIG. 3, the apparatus includes a receiving module 1 and a sending module 2. The receiving module 1 is adapted to receive identity information sent from the UE. The ID information is allocated to the UE by the S-eNB. The sending module 2 is adapted to send the parameters allocated for the UE to the UE if identity information, matching the received identity information sent from the UE, is available in the T-eNB, and to continue the handover process.

In this embodiment, the receiving module 1 receives the ID information allocated for the UE by the S-eNB and queries whether identity information, matching the received identity information sent from the UE, is available in the T-eNB. If the identity information is available in the T-eNB, it indicates that the T-eNB is the candidate T-eNB selected during the handover preparation. The candidate T-eNB has the context information of the UE and can perform the network handover. The T-eNB sends the parameters allocated for the UE to the UE. The parameters may include the security parameter, C-RNTI, RB, and PDCP. The network handover processing apparatus provided in this embodiment can reduce the handover delay. The UE can stay in the active state all along during the network handover, instead of changing from the active state to the idle state and then changing back to the active state. Thus the state change times are reduced and the system resources are saved.

Figure 4:
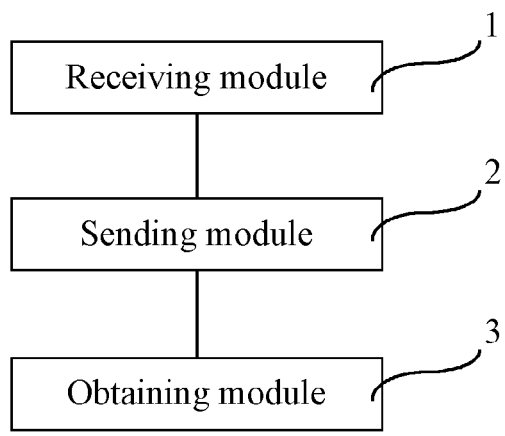
FIG. 4 shows a structure of a network handover processing apparatus according to a second apparatus embodiment of the present invention.

As shown in FIG. 4, based on the foregoing embodiment, the network handover processing apparatus may further include an obtaining module in addition to the receiving module 1 and the sending module 2. The obtaining module 3 is adapted to obtain the ID information sent through the Handover Request message by the S-eNB, or to obtain the ID information sent by the S-eNB after the radio link between the UE and the S-eNB fails.

The ID information received by the receiving module and sent from the UE includes one or any combination of: C-RNTI, S-TMSI, other ID of UE, source cell ID, and S-eNB ID The network handover processing apparatus in this embodiment may be set in a NodeB as a functional module of the NodeB. The apparatus can implement the process of the foregoing method embodiment.

Figure 5:
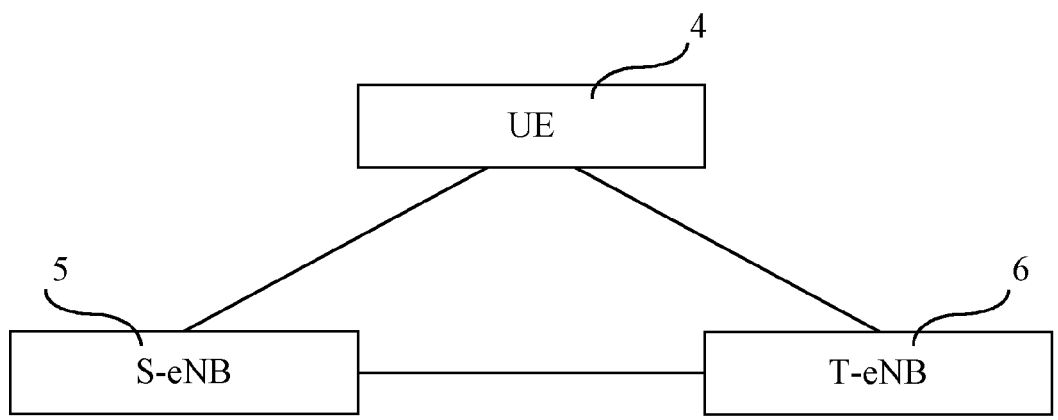
FIG. 5 shows a structure of a communication system according to an embodiment of the present invention.

An embodiment of the present invention provides a communication system. As shown in FIG. 5, the system includes a UE 4, an S-eNB 5, and a T-eNB 6. The UE 4 is adapted to discover a target cell after detecting a radio link failure and to send the ID information allocated for the UE 4 by the S-eNB 5 to a T-eNB 6 corresponding to the target cell. The T-eNB 6 is adapted to send parameters allocated for the UE 4 to the UE 4 if the T-eNB 6 has ID information the same as the ID information sent from the UE 4, and to continue the handover process.

In the communication system provided by this embodiment, after the radio link failure occurs during the network handover, the UE sends the ID information to the selected T-eNB. By judging whether the T-eNB has the same ID information, the T-eNB can know whether the T-eNB is the candidate T-eNB selected by the S-eNB during the network handover preparation, that is, whether the context information of the UE exists. If the same ID information exists, the handover process is continued. Thus the state change times are reduced and the handover efficiency is improved. The UE can stay in the active state, instead of changing from the active state to the idle state and then changing back to the active state. Thus the state change times are reduced and the system resources are saved.

The ID information in the T-eNB in this embodiment is sent by the S-eNB. The S-eNB may send the ID information to the T-eNB through a Handover Request message. Alternatively, when the radio link with the UE fails, the S-eNB may send the ID information to the T-eNB.

The T-eNB is further adapted to send the radio bearer configuration parameters to the UE and to continue the handover process. The S-eNB is adapted to send the ID information allocated for the UE to at least one candidate T-eNB.

The communication system provided in this embodiment can enable the UE to stay in the active state all along during the network handover, instead of changing from the active state to the idle state and then changing back to the active state. Thus the state change times are reduced and the system resources are saved.

In the foregoing embodiments, the S-eNB allocates the ID information to the UE and sends the ID information to the candidate T-eNB; when a radio link failure occurs, the UE sends the ID information to the T-eNB; if the T-eNB has the same ID information, it indicates that the T-eNB is one of the candidate T-eNBs and stores the context information of the UE. Hence, the T-eNB does not need to obtain the context from the S-eNB. Therefore, the handover delay is reduced, and the UE can stay in the active state, instead of changing from the active state to the idle state and then changing back to the active state. Thus the state change times are reduced and the system resources are saved.

Although the technical solution of the present invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for performing a network handover process, comprising:
   receiving from a source evolved NodeB (eNB), by a target eNB, identity information allocated to a user equipment by the source eNB;
   receiving, by the target eNB, identity information sent from the user equipment;
   determining, by the target eNB, whether the identity information received from the user equipment matches the identity information allocated to the user equipment received by the target eNB from the source eNB; and
   when the identity information received from the user equipment matches the identity information allocated to the user equipment received by the target eNB from the source eNB, sending, by the target eNB, one or more parameters to the user equipment;
   wherein, the identity information allocated to the user equipment comprises: a Cell Radio Network Temporary Identifier (C-RNTI) and a source cell identity; and
   wherein the one or more parameters are allocated to the user equipment by the target eNB.

2. The method according to claim 1, further comprising:
   after receiving the identity information allocated to the user equipment from the source eNB, storing, by the target eNB, the identity information allocated to the user equipment by the source eNB.

3. The method according to claim 1, wherein receiving the identity information allocated to the user equipment from the source eNB comprises:
   receiving, by the target eNB, a handover request message sent from the source eNB, wherein the handover request message comprises the identity information allocated to the user equipment by the source eNB.

4. The method according to claim 1, further comprising:
   when the identity information received from the user equipment does not match the identity information allocated to the user equipment received by the target eNB from the source eNB, ending the handover process.

5. An evolved NodeB (eNB) in a communication network that is a target eNB in a handover process, comprising:
   a communication interface, configured to receive from a source eNB, identity information allocated to a user equipment by the source eNB;
   a receiver, configured to receive identity information sent from the user equipment;
   a processor, configured to determine whether the identity information received from the user equipment matches the identity information allocated to the user equipment received by the target eNB from the source eNB; and
   a transmitter, configured to send one or more parameters to the user equipment, when the identity information received from the user equipment matches the identity information allocated to the user equipment received by the target eNB from the source eNB;
   wherein, the identity information allocated to the user equipment comprises:
   a Cell Radio Network Temporary Identifier (C-RNTI) and a source cell identity; and
   wherein the one or more parameters are allocated to the user equipment by the target eNB.

6. The eNB according to claim 5, further comprising:
   a storage unit, configured to store the identity information allocated to the user equipment by the source eNB received from the source eNB.

7. The eNB according to claim 5, wherein the communication interface is configured to receive a handover request message, sent from the source eNB, wherein the handover request message includes the identity information allocated to the user equipment by the source eNB.

8. A method for performing a network handover process, comprising:
   sending, by a user equipment, identity information to a target evolved NodeB (eNB), wherein the identity information comprises identity information allocated to the user equipment by a source eNB; and
   receiving, by the user equipment, one or more parameters allocated by the target eNB, sent from the target eNB;
   wherein the one or more parameters are sent from the target eNB when the target eNB determines that the received identity information from the user equipment matches any identity information received from the source eNB; and
   wherein, the identity information allocated to the user equipment comprises: a Cell Radio Network Temporary Identifier (C-RNTI) and a source cell identity.

9. The method according to claim 8, wherein the identity information allocated to the user equipment which is sent to the target eNB by the source eNB is stored in the target eNB.

10. A user equipment configured to be in communication with one or more evolved NodeBs (eNBs) in a handover process, wherein at least one of the eNBs is a source eNB and at least one of the eNBs is a target eNB, the user equipment comprising:
    a transmitter, configured to send identity information to a target eNB, wherein the identity information comprises identity information allocated to the user equipment by a source eNB; and
    a receiver, configured to receive one or more parameters allocated by the target eNB, sent from the target eNB;

wherein the one or more parameters are sent from the target eNB when the target eNB determines that the received identity information from the user equipment matches any identity information received from the source eNB; and wherein, the identity information allocated to the user equipment comprises: a Cell Radio Network Temporary Identifier (C-RNTI) and a source cell identity.

11. The user equipment according to claim 10, wherein the identity information allocated to the user equipment which is sent to the target eNB by the source eNB is stored in the target eNB.

* * * * *